(12) United States Patent
Chiang et al.

(10) Patent No.: US 8,576,585 B2
(45) Date of Patent: Nov. 5, 2013

(54) POWER DEVICE

(75) Inventors: Chao-Tung Fan Chiang, Taipei (TW); Yi-Min Lin, Taipei (TW); Li-Yang Lin, Taipei (TW)

(73) Assignee: Unihan Corporation, Taipei (TW)

( * ) Notice: Subject to any disclaimer, the term of this patent is extended or adjusted under 35 U.S.C. 154(b) by 471 days.

(21) Appl. No.: 13/019,405

(22) Filed: Feb. 2, 2011

(65) Prior Publication Data

US 2011/0194320 A1     Aug. 11, 2011

(30) Foreign Application Priority Data

Feb. 10, 2010  (TW) ................................ 99104099 A

(51) Int. Cl.
*H02M 3/335*  (2006.01)
(52) U.S. Cl.
USPC ...................................... 363/21.07; 363/21.15
(58) Field of Classification Search
USPC ........... 363/16, 20, 21.01, 21.07, 21.1, 21.15, 363/21.18, 95, 97, 131
See application file for complete search history.

(56) References Cited

U.S. PATENT DOCUMENTS

| 6,320,766 | B1 | 11/2001 | Park |  |
|---|---|---|---|---|
| 6,987,677 | B2 * | 1/2006 | Konno | 363/49 |
| 7,309,977 | B2 * | 12/2007 | Gray et al. | 323/284 |
| 2011/0273912 | A1 * | 11/2011 | Kim et al. | 363/21.09 |

FOREIGN PATENT DOCUMENTS

| CN | 101009468 A | 8/2007 |
|---|---|---|
| CN | 200990515 | 12/2007 |
| JP | 11-299090 | 10/1999 |
| TW | 200622543 A | 7/2006 |

OTHER PUBLICATIONS

English translation of abstract of CN 101009468 A (published Aug. 1, 2007).
English translation of abstract of CN 200990515 (published Dec. 12, 2007).
English translation of abstract of JP 11-299090.
English translation of abstract of TW 200622543 A (published Jul. 1, 2006).

* cited by examiner

*Primary Examiner* — Matthew Nguyen
(74) *Attorney, Agent, or Firm* — McClure, Qualey & Rodack, LLP

(57) ABSTRACT

A power device includes a power supply module, a first electrical isolation unit, a second electrical isolation unit, a feedback control unit, and a comparing unit. The power supply module includes a feedback compensating terminal and an output terminal, the feedback compensating terminal provides a related voltage of output power, and the output terminal provides an output voltage. When the related voltage of output power is smaller than the predetermined voltage, the comparing unit controls the first electrical isolation unit to change operation of the feedback control unit and the second electrical isolation unit, to allow the power supply module to adjust the output voltage.

8 Claims, 4 Drawing Sheets

POWER DEVICE

CROSS-REFERENCE TO RELATED APPLICATIONS

This Non-provisional application claims priority under 35 U.S.C. §119(a) on Patent Application No(s). 099104099 filed in Taiwan, Republic of China on Feb. 10, 2010, the entire contents of which are hereby incorporated by reference.

BACKGROUND OF THE INVENTION

1. Field of the Invention

This invention relates to a power device and, more particularly, to a power device used for saving power in a standby mode.

2. Description of the Related Art

At present, electrical equipment in life increases rapidly. The electrical equipment, such as audio/video products and office equipment, has still a large power consumption problem during a standby period, which consumes electrical power and money and also has a bad effect on environment. For the above reason, corresponding regulations are used to strictly limit power consumption of most of the present products during the standby period. The standby mode is a state that the most function of a product is turned off and the basic function which the product needs in the standby mode is turned on and the product is waiting for rebooting by a user. For example, when a display is in the standby mode, a user can use a remote controller to reboot the display to normally operate.

A power supply is mainly used to provide power with a stable and suitable voltage for a single or a plurality of electrical devices, and it is one of necessary and important function elements. Generally, the power supply can convert inputted AC commercial power into DC power needed by an electrical device. In FIG. 1, a conventional power device 1 usually includes an AC/DC power converter 11 and a DC/DC power converter 12 for power conversion. The AC/DC power converter 11 is used to convert an AC voltage (commercial power) to a DC voltage, and then the DC/DC power converter 12 converts the DC voltage to different kinds of DC low voltages needed by loads 6 in an electrical device.

In the conventional power device 1, there are converting losses of the AC/DC power converter 11 and the DC/DC power converter 12, since the AC/DC power converter 11 provides constant voltage no matter whether the electrical device is in a normal operating state or a standby mode, so that it still need the DC/DC power converter 12 that causes the additional voltage converting lose in the standby mode. Thus the performance of the power device 1 is affected and the power saving effect is also affected.

BRIEF SUMMARY OF THE INVENTION

One objective of this invention is to provide a power device, when the power device is in a standby mode, it can determine whether is in the standby mode to change from the output voltage to the voltage needed in the standby mode, thereby reducing the converting lose and conforming to requirements of power-saving regulations.

This invention provides a power device including a power supply module, a first electrical isolation unit, a second electrical isolation unit, a feedback control unit, and a comparing unit. The power supply module includes a feedback compensating terminal and an output terminal. The feedback compensating terminal provides a related voltage of output power, and the output terminal provides an output voltage. The first electrical isolation unit includes a first input terminal and a first output terminal. The second electrical isolation unit includes a second input terminal and a second output terminal. The feedback control unit is coupled with the first output terminal, the second input terminal, the output terminal of the power supply module, respectively. The comparing unit is coupled with the feedback compensating terminal and the first input terminal, respectively, and it compares the related voltage of output power with a predetermined voltage. When the related voltage of output power is smaller than the predetermined voltage, the comparing unit controls the first electrical isolation unit to change operation of the feedback control unit and the second electrical isolation unit, to reduce a voltage of the feedback compensating terminal thus to make the power supply module adjust the output voltage.

According to the invention, the power device uses the comparing unit to compare the related voltage of output power with the predetermined voltage to determine whether a present load unit is in a normal state or a standby mode. When the present load unit is in the standby mode, the comparing unit outputs a standby load signal to the feedback control unit and makes the feedback control unit output a standby feedback signal to the power supply module, thus to reduce the output voltage of the power supply module. Therefore, in the standby mode, the power device can directly provide basic power needed in the power-saving mode or standby mode, without converting the voltage to the voltage needed by the electrical device during the standby mode via multiple conversions, thus reducing too much circuit losses and conforming to requirements of power-saving regulations.

These and other features, aspects, and advantages of the present invention will become better understood with regard to the following description, appended claims, and accompanying drawings.

DETAILED DESCRIPTION OF THE INVENTION

A power device according to one embodiment of this invention is described, and the same elements are marked by the same reference numbers.

Figure 1:
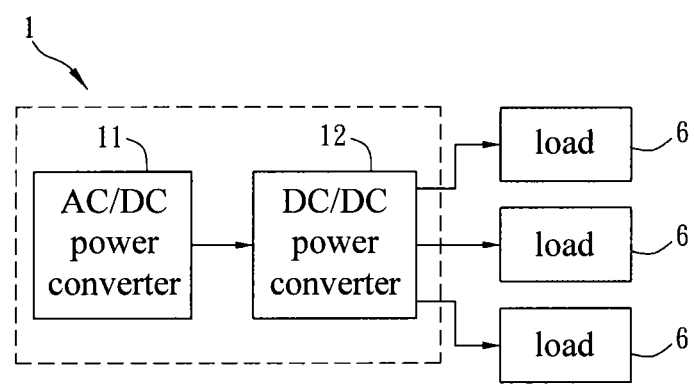
FIG. 1 is a schematic diagram showing a conventional power device.
Figure 2:
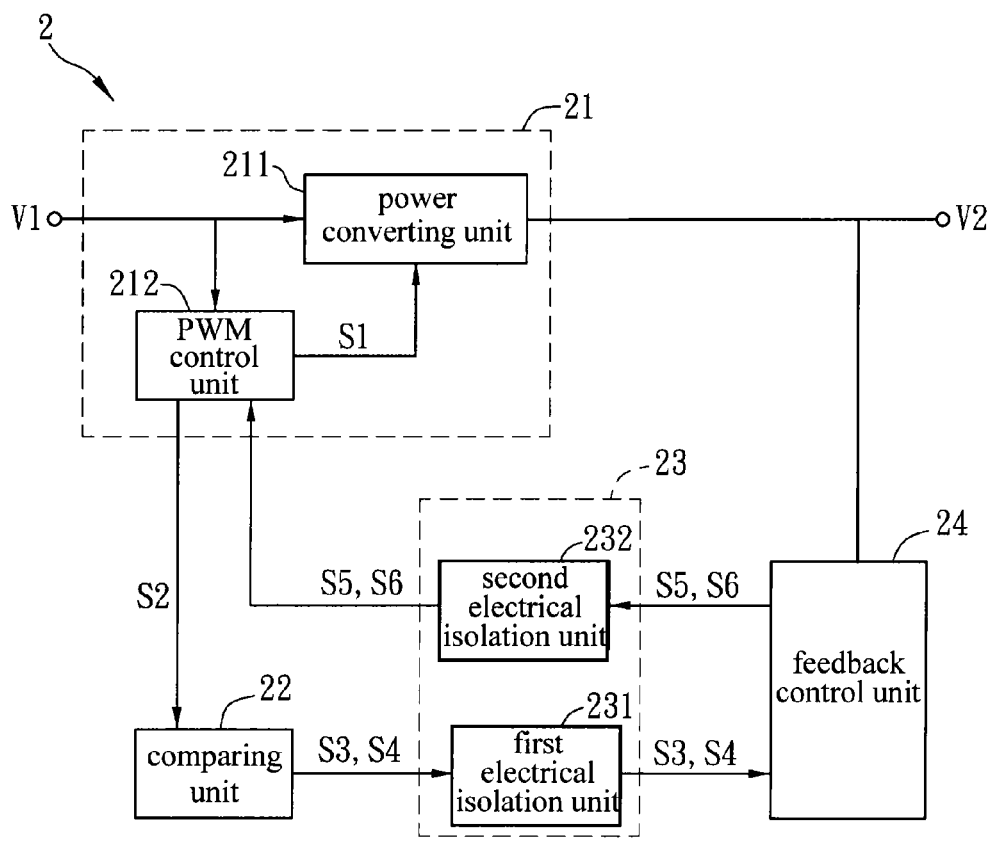
FIG. 2 is a schematic diagram showing a power device according to one embodiment of the invention.

FIG. 2 is a schematic diagram showing a power device according to one embodiment of the invention. In FIG. 2, the power device 2 cooperates with an electrical device (not shown). In the embodiment, the electrical device may be a notebook computer or a digital set-top box. In the embodiment, input power of the power device 2 is AC power of commercial power, i.e., the AC power may be 90 V to 264 V. The power device 2 includes a power supply module 21, a comparing unit 22, a feedback control unit 24 and an electrical isolation module 23.

The power supply module 21 includes a power converting unit 211 and a pulse-width modulation (PWM) controller 212. In the embodiment, the power converting unit 211 is a fly-back converter and may include an input terminal, an output terminal, a bridge rectifier, a switching element, and a transformer (not shown).

An AC input voltage V1 is inputted from the input terminal to the power converting unit 211, and the bridge rectifier of the power converting unit 211 converts the AC input voltage V1 to a DC voltage. When the switching element is turned on, and a circuit of the power converting unit 211 is in an operating state, the DC voltage charges an inductor at a primary side of the transformer until the switching element is turned off. Then the inductor of the transformer begins to discharge, and another DC voltage is generated at a secondary side of the transformer, such that the output terminal 211b provides an output voltage V2. In the embodiment, the switching element is a transistor.

The PWM controller 212 is coupled with the power converting unit 211, and the PWM controller 212 has a feedback compensating terminal. In the embodiment, the feedback compensating terminal can also be called a voltage feedback input pin of the PWM controller 212. A DC voltage usually exists on the pin for indicating an output load.

The PWM controller 212 outputs a switching control signal S1 and a related voltage of output power S2. The related voltage of output power S2 is a DC voltage. The PWM controller 212 controls the switching element of the power converting unit 211 via the switching control signal S1.

In the embodiment, the switching control signal S1 is used for controlling a switching period of the switching element of the power converting unit 211 thus to indirectly control the voltage and current of the transformer of the power converting unit 211. When the power converting unit 211 includes two switching elements, the switching control signal is a pair of PWM signals, wherein one of the PWM signals is in an on state, the other PWM signal is in an off state.

The comparing unit 22 is coupled with the feedback compensating terminal of the PWM controller 212 and receives the related voltage of output power S2. The comparing unit 22 compares the related voltage of output power S2 with a predetermined voltage and outputs a normal load signal S3 or a standby load signal S4. In the embodiment, the predetermined voltage can be obtained by division via two resistors (not shown).

When the related voltage of output power S2 is greater than the predetermined voltage, the comparing unit 22 can output the normal load signal S3; when the related voltage of output power S2 is smaller than or equal to the predetermined voltage, the comparing unit 22 can output the standby load signal S4.

The electrical isolation module 23 includes a first side and a second side. The feedback compensating terminal of the PWM controller 212 and the comparing unit 22 are coupled with the first side of the electrical isolation module 23. The feedback control unit 24 is coupled with the second side of the electrical isolation module 23. In this embodiment, the electrical isolation module 23 includes a first electrical isolation unit 231 and a second electrical isolation unit 232. The first electrical isolation unit 231 and the second electrical isolation unit 232 have the first side and the second side, respectively. The first side of the first electrical isolation unit 231 is coupled with the comparing unit 22. The second side of the first electrical isolation unit 231 is coupled with the feedback control unit 24. The first side of the second electrical isolation unit 232 is coupled with the feedback compensating terminal of the PWM controller 212. The second side of the second electrical isolation unit 232 is coupled with the feedback control unit 24.

In the embodiment, the first electrical isolation unit 231 and the second electrical isolation unit 232 are a photo coupler, respectively. The photo coupler is used for providing the transistor for protecting electronic components and can provide total electrical isolation. The electrical isolation can prevent from a dangerous voltage coupling to an anther side circuit thus to conform to regulations of a security check.

In this embodiment, the first side of the first electrical isolation unit 231 and the second electrical isolation unit 232 are coupled with a grounding terminal. The second side of the first electrical isolation unit 231 is coupled with another grounding terminal. The second side of the second electrical isolation unit 232 is coupled with the feedback control unit 24. Therefore, the first electrical isolation unit 231 and the second electrical isolation unit 232 can isolate the electric properties between the first side and the second side. In addition, in this embodiment, the transformer of the power converting unit 211 is also an electrical isolation element.

Figure 3:
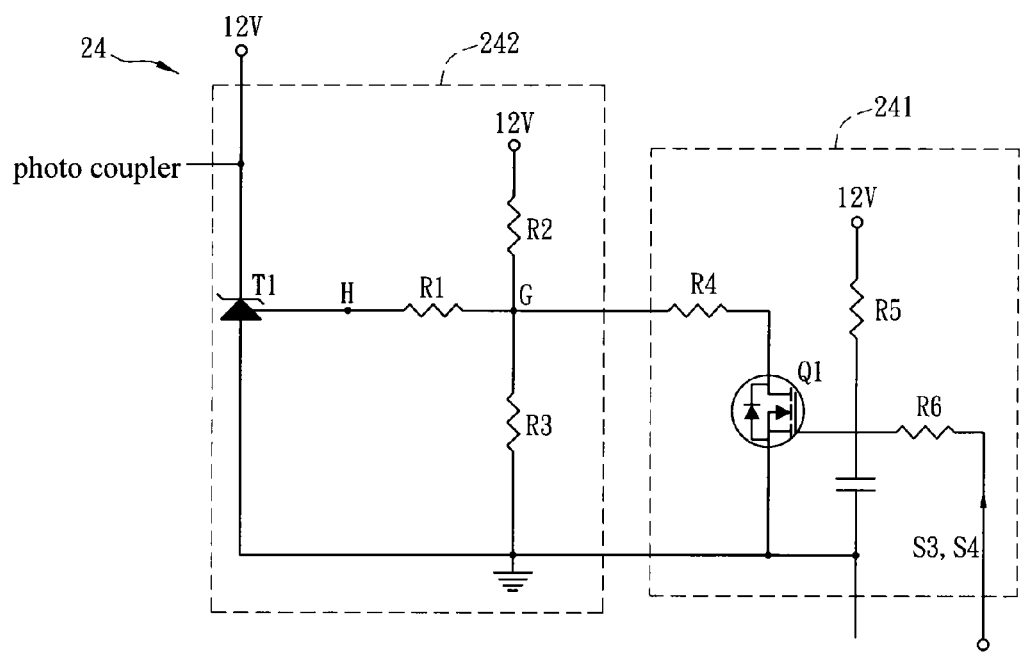
FIG. 3 is a schematic diagram showing a schematic diagram of the feedback control unit.

Please refer to FIG. 2 and FIG. 3 together. FIG. 3 is a schematic diagram of the feedback control unit 24. The feedback control unit 24 is coupled with the second side of the first electrical isolation unit 231 and the second electrical isolation unit 232. The feedback control unit 24 is coupled with the output terminal of the power supply module 21. The feedback control unit 24 includes a standby mode switching circuit 241 and a feedback voltage control circuit 242.

The standby mode switching circuit 241 is coupled with the second side of the first electrical isolation unit 231. The feedback voltage control circuit 242 is coupled with the standby mode switching circuit 241 and the second side of the second electrical isolation unit 232. The standby mode switching circuit 241 and the feedback voltage control circuit 242 receive the output voltage V2 of the power supply module 21, respectively. The feedback control unit 24 receives a normal load signal S3 or a standby load signal S4 via the electrical isolation module 23. The feedback control unit 24 controls the feedback voltage control circuit 242 to provide a normal feedback signal S5 or a standby feedback signal S6 based on the normal load signal S3 or the standby load signal S4 and transfer the normal feedback signal S5 or the standby feedback signal S6 to the PWM controller 212 via the electrical isolation module 23.

In this embodiment, the standby feedback signal S6 is a feedback voltage. The feedback control unit 24 turns on the second electrical isolation unit 232 of the electrical isolation module 23 based on the feedback voltage and makes the power converting unit 211 to adjust the output voltage V2.

In this embodiment, the comparing unit 22 transfers the normal load signal S3 or the standby load signal S4 to the feedback control unit 24 via the first electrical isolation unit 231. The feedback control unit 24 transfers the normal feedback signal S5 or the standby feedback signal S6 to the PWM controller 212 via the second electrical isolation unit 232.

In FIG. 3, when the standby mode switching circuit 241 receives the normal load signal S3, the transistor Q1 of the standby mode switching circuit 241 is turned on. Therefore, the voltage of the node G of the feedback voltage control circuit 242 is obtained by the dividing voltage of the resistance R2 and the parallel connection of the resistances R3, R4. The feedback voltage control circuit 242 includes a regulator controller T1 having a reference voltage, such as 1.25 V. When the voltage of the node H is equal to 1.25 V, the output voltage V2 provided by of the power converting unit 211 is kept on 12 V.

When the standby mode switching circuit 241 receives the standby load signal S4 and a dividing voltage which is divided form 12 V exists on the node coupled with the resistances R5, R6 and the gate end of the transistor Q1, the transistor Q1 of the standby mode switching circuit 241 is turned off. Therefore, the voltage of the node G is changed to the voltage which is divided by resistances R2, R3. In this status, the voltage of the regulator controller can achieve 1.25 V without the higher output voltage V2. Therefore, the feedback control unit 24 provides the standby feedback signal S6 to the PWM controller 212 so that the PWM controller 212 reduces the width of pulse of the PWM signal and extends the off state of the switching control signal S1 to reduce the output voltage V2 of the power supply module 21 for saving power in a standby mode.

In addition, since the power supply module 21 is a switching mechanism operated in a high frequency, high-frequency electromagnetic wave signals may be generated to interfere with other devices having high-frequency signals, such as a mobile phone. Therefore, according to the power device 2 in the embodiment, a filter (not shown) is disposed at an input terminal and an output terminal of the power supply module 21, respectively, for filtering interfering signals, and the filter may be an EMI filter.

Figure 4:
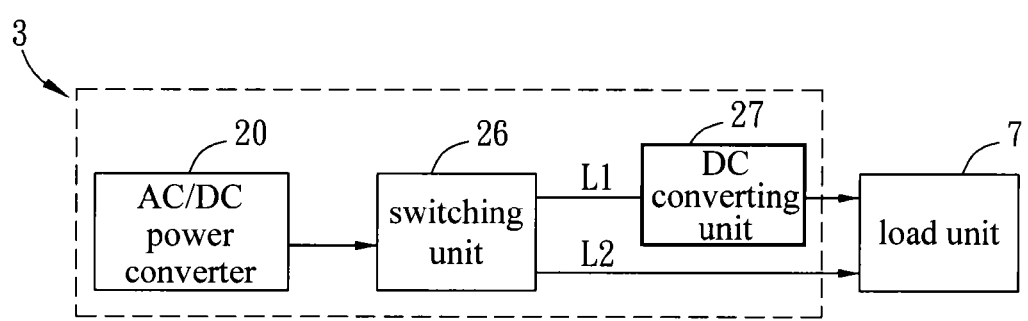
FIG. 4 is a schematic diagram showing a power device according to another embodiment of the invention.

FIG. 4 is a schematic diagram showing a power device according to another embodiment of the invention. The power supply module 21, the comparing unit 22, the electrical isolation module 23 and the feedback control unit 24 in FIG. 2 are integrated into an AC/DC power converter 20 in FIG. 4. The power device 3 further includes a switching unit 26 coupled with an output terminal of the AC/DC power converter 20, and the switching unit 26 couples the output terminal of the AC/DC power converter 20 with a first circuit L1 or a second circuit L2. The first circuit L1 is coupled with a load unit 7 via a DC converting unit 27, and the second circuit L2 is coupled with the load unit 7. In the embodiment, the DC converting unit 27 is a DC/DC power converter. When the load unit 7 is in a standby mode, the switching unit 26 can couple the output terminal of the AC/DC power converter 20 with the second circuit L2, such that the AC/DC power converter 20 can directly provide lower voltage values for the load unit 7.

When the load unit 7 is in a normal running state, the switching unit 26 couples the output terminal of the AC/DC power converter 20 with the first circuit L1, such that the AC/DC power converter 20 is coupled with the DC converting unit 27 and provides a voltage value or a plurality of voltage values for the load unit 7.

To sum up, according to the power device in the preferred embodiments of the invention, the comparing unit is used to compare the related voltage of output power with the predetermined voltage to determine whether the present load unit is in a normal state or a standby mode. When the present load unit is in the standby mode, the comparing unit outputs a standby load signal to the switching circuit of the feedback control unit and allows the feedback control unit to output a standby feedback signal to the PWM controller thus to reduce the output voltage of the power converting unit. When the power device disclosed in the invention is in the standby mode, a DC converter does not need to convert DC voltages to the voltage needed by the standby electrical devices via multiple conversions, thus reducing too much circuit losses and conforming to requirements of power-saving regulations.

Although the present invention has been described in considerable detail with reference to certain preferred embodiments thereof, the disclosure is not for limiting the scope of the invention. Persons having ordinary skill in the art may make various modifications and changes without departing from the scope and spirit of the invention. Therefore, the scope of the appended claims should not be limited to the description of the preferred embodiments described above.

What is claimed is:

1. A power device comprising:
    a power supply module having a feedback compensating terminal and an output terminal, the feedback compensating terminal providing a related voltage of output power, the output terminal providing an output voltage;
    a comparing unit coupled with the feedback compensating terminal and comparing the related voltage of output power with a predetermined voltage;
    a feedback control unit coupled with the output terminal and providing a feedback voltage; and
    an electrical isolation module, having a first side and a second side, the first side of the electrical isolation module coupled with the comparing unit and the feedback compensating terminal, the second side of the electrical isolation module coupled with the feedback control unit,
    wherein when the related voltage of output power is smaller than the predetermined voltage, the feedback voltage turned on the electrical isolation module and make the power supply module adjust the output voltage;
    wherein the feedback control unit includes a standby mode switching circuit and a feedback voltage control circuit, the standby mode switching circuit is coupled with the electrical isolation module, and the feedback voltage control circuit is coupled with the standby mode switching circuit and the electrical isolation module.

2. The power device according to claim 1, wherein the power supply module includes a power converting unit and a pulse-width modulation (PWM) controller, the power converting unit is coupled with the PWM controller, and the PWM controller having the feedback compensating terminal.

3. The power device according to claim 1, wherein the electrical isolation module includes a first electrical isolation unit which has a first side and a second side, the first side is coupled with the comparing unit, and the second side is coupled with the feedback control unit.

4. The power device according to claim 3, wherein the first electrical isolation unit is a photo coupler.

5. The power device according to claim 1, wherein the electrical isolation module includes a second electrical isolation unit which has a first side and a second side, the first side of the second electrical isolation unit is coupled with the feedback compensating terminal, and the second side of the second electrical isolation unit is coupled with the feedback control unit.

6. The power device according to claim 5, wherein the second electrical isolation unit is a photo coupler.

7. The power device according to claim 1, further comprising:
    a switching unit coupled with the output terminal of the power supply module, the switching unit coupling the output terminal of the power supply module with a first circuit or a second circuit.

8. The power device according to claim 7, wherein the first circuit and the second circuit are coupled with a DC converting unit and a load unit, respectively.

* * * * *